United States Patent [19]

Petrovic et al.

[11] 4,436,589

[45] Mar. 13, 1984

[54] METHOD OF PRETREATING COAL FOR COKING PLANT

[75] Inventors: Vladan Petrovic; Heinz Rotthaus, both of Essen, Fed. Rep. of Germany

[73] Assignee: Krupp-Koppers GmbH, Essen, Fed. Rep. of Germany

[21] Appl. No.: 376,834

[22] Filed: May 10, 1982

[30] Foreign Application Priority Data

May 29, 1981 [DE] Fed. Rep. of Germany ....... 3121285

[51] Int. Cl.³ .................... C10B 39/02; C10B 57/10
[52] U.S. Cl. ......................................... 201/41; 34/10; 432/14; 432/16
[58] Field of Search .................. 201/39, 41; 202/228, 202/270; 34/10; 432/14, 16

[56] References Cited

U.S. PATENT DOCUMENTS

| 3,843,458 | 10/1974 | Kemmetmueller | 201/39 |
| 4,053,364 | 10/1977 | Poersch et al. | 202/228 |
| 4,202,733 | 5/1980 | Luke et al. | 201/41 |

FOREIGN PATENT DOCUMENTS

| 2435500 | 2/1976 | Fed. Rep. of Germany | 202/228 |
| 2647079 | 4/1978 | Fed. Rep. of Germany | 201/41 |

*Primary Examiner*—Bradley Garris
*Attorney, Agent, or Firm*—Michael J. Striker

[57] ABSTRACT

Coal is pretreated for a coking plant so that it is passed in two stages through two throughflow driers successively connected with one another, the driers are supplied with a heat carrier formed by a steam overheated to a temperature between 400° and 600° C., dust is removed from the steam after passing the throughflow driers, and the steam is heated after the dust removal in a heat exchange with a circulating gas of a coke dry cooler.

4 Claims, 1 Drawing Figure

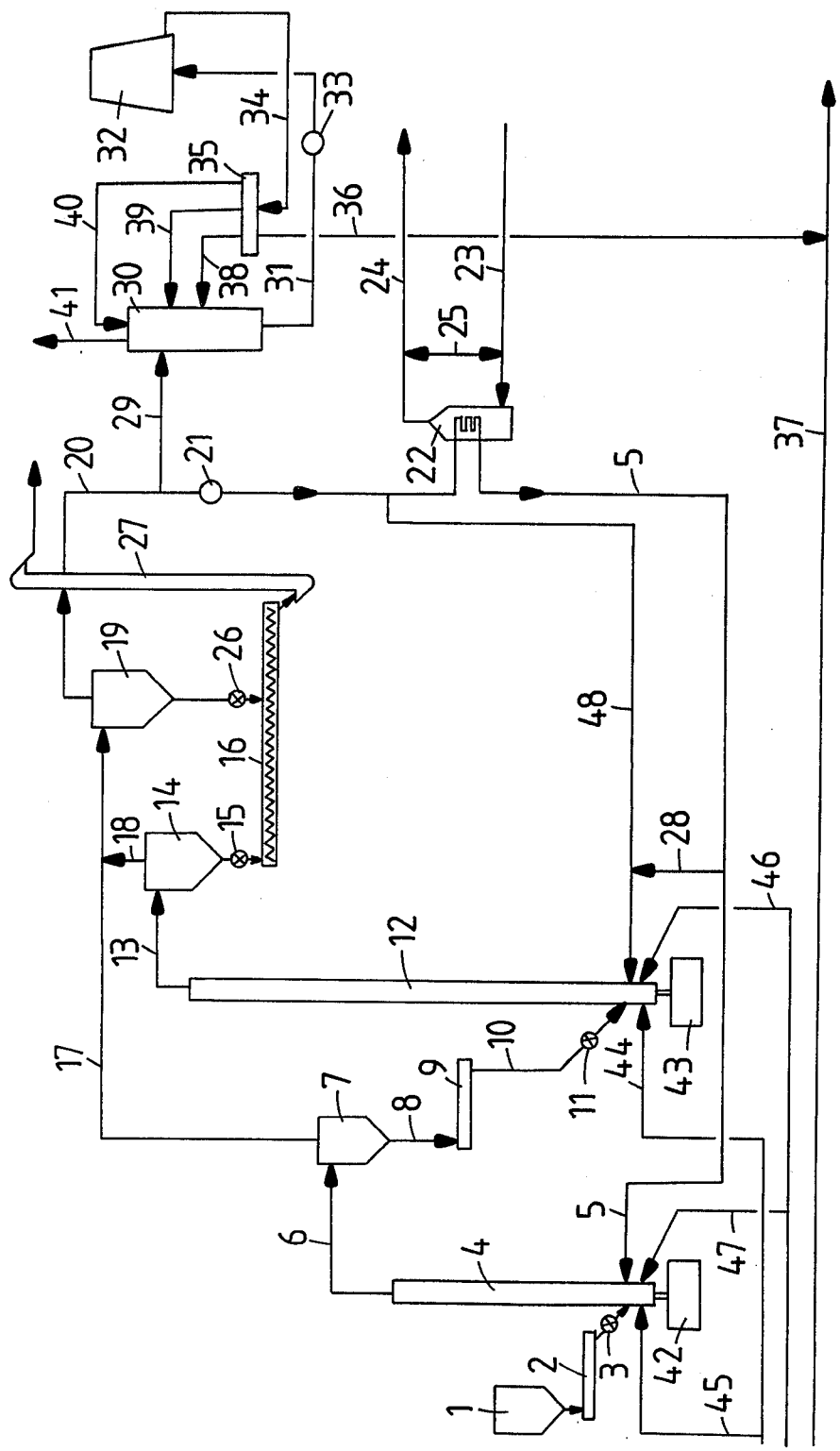

METHOD OF PRETREATING COAL FOR COKING PLANT

BACKGROUND OF THE INVENTION

The present invention relates to a method of and an arrangement for pretreating coal for a coking plant. More particularly, the present invention relates to a method of and an arrangement for pretreating coal for a coking plant, in which coke ovens are periodically supplied with preheated coal, the produced coke is subjected to dry cooling with a gaseous cooling medium, and the exhaust steam produced during the coke dry cooling is used for coal preheating.

Methods and arrangements of the above mentioned general type are known in the art. One such method and arrangement is disclosed, for example, in the German Auslegeschrift 2,342,184. A circulating gas of the coke dry cooling is used in a heat exchanger (waste-heat boiler) for producing steam. This steam with a temperature less than 500° C., particularly 250° C., is used both as a heating medium and also as a fluidized bed medium for the coal preheating. The coal preheating is performed here in one stage in a fluidized layer, and a desulfurization must be performed with addition of CaO or MgO pellets. The above described method and arrangement possess some disadvantages, in the sense of optimal utilization of heat from coke dry cooling, the process of coal preheating, and the construction of the apparatus used.

SUMMARY OF THE INVENTION

Accordingly, it is an object of the present invention to provide a method of and an arrangement for pretreating coal for a coking plant, which avoid the disadvantages of the prior art.

More particularly, it is an object of the present invention to provide a method of and an arrangement for pretreating coal for a coking plant, in which heat released during coke dry cooling is used as optimally as possible, the process of coal preheating is further improved, and the arrangement is simplified.

In keeping with these objects and with others which will become apparent hereinafter, one feature of the present invention resides in a method of pretreating coal for a coking plant which has the steps of passing coal in two stages through two throughflow driers successively connected with one another, supplying the throughflow driers with a heat carrier formed by steam overheated to a temperature between 400° and 600° C., removing dust from the steam after passing the throughflow driers, and heating the steam after dust removal in a heat exchange with a circulating gas of a coke dry cooling.

Another feature of the present invention is an arrangement which has two throughflow driers arranged successively one after the other so that coal passes in two stages successively through the driers, means for supplying the throughflow driers with a heat carrier formed by steam overheated to a temperature between 400° and 600° C., means for removing dust from the steam after passing through the throughflow driers, and means for heating the steam after dust removal in a heat exchange with a circulating gas of a coke dry cooling.

When the method is performed and the arrangement is designed in accordance with the present invention, heat released during coke dry cooling is utilized in an optimum manner, the process of coal preheating is improved, and the arrangement is simplified.

Still a further feature of the present invention is that the coal is heated in the first of the driers to a temperature between 70° and 90° C. and to a water content of substantially 2% by weight, and in the second of the driers coal is heated to a temperature of substantially 200° C. and a residual water content of substantially between 0 and 0.1% by weight.

In accordance with an additional feature of the present invention, the first of the driers is supplied with steam which is heated exclusively to a temperature of substantially 600° C., whereas the second of the driers is supplied with steam heated to a temperature between 400° and 500° C.

It is possible that the steam supplied to the second drier is produced by mixing of a partial stream of the steam overheated to a temperature of 600° C. with a vapor produced by drying coal in the driers and withdrawn therefrom.

Finally, it is also possible to remove excessive steam from vapor produced by drying coal in the driers and withdrawn from the latter, in which case this removal can be performed by partially condensing the vapor.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a view schematically showing an arrangement for pretreating coal for a coking oven in accordance with the present invention.

DESCRIPTION OF A PREFERRED EMBODIMENT

An inventive method of pretreating coal is performed in an inventive arrangement which is shown in the drawing, wherein only parts which are important for understanding of the invention are shown. Additional devices, as well as parts of a coking plant proper and a coke dry cooling device, are not shown in the drawing. Moist coal is supplied from a supply bin 1 with a water content of approximately 9% by weight to a throughflow drier 4 with the aid of a shaker loader 2 and a cellular wheel sluice 3 arranged in a housing. The coal is supplied to a bottom of the throughflow drier 4. A conduit 5 opens into the throughflow drier 4 at the height of the coal supply. Overheated steam is blown through the conduit 5 into the throughflow drier 4 with a temperature of substantially 600° C. The coal is dried in the first throughflow drier 4 to a temperature of 80° C. and to a water content of approximately 2% by weight. The coal leaves the throughflow drier 4 through its upper part and flows via a conduit 6 to a primary cyclone 7 in which coarser coal particles are separated from finer coal particles with a grain size less than 0.2 mm. Also, the vapors are separated from the coal in this cyclone. The coarser coal particles flow from the primary cyclone 7 via a conduit 8 and arrive at a shaker loader 9 provided with a housing. The coal further travels from the shaker loader 9 via a conduit 10 and a cellular wheel sluice 11 to a lower part of a second throughflow drier 12.

A conduit 48 opens in the throughflow drier 12 at the height of the coal supply. Steam with a temperature of approximately 500° C. is blown into the throughflow drier 12 via the conduit 48. The coal is dried in the throughflow drier 12 to a temperature of approximately 200° C. and to a residual moisture of between 0 and 0.1% by weight $H_2O$.

The heated and dried coal travels via a conduit 13 in a cyclone 14 in which again the coarser coal particles are separated from the finer coal particles and the vapors. The coal separated in the cyclone 14 is supplied via a cellular wheel sluice 15 into a trough screw conveyor 16. The vapors which contain the finer coal particles with a grain size of less than 0.2 mm are drawn via a conduit 18 from the cyclone 14 and supplied into the conduit 17 in which they join the vapors containing the fine grain particles and coming from the primary cyclone 7.

The conduit 17 opens into a cyclone 19 in which the fine coal is separated from the vapors. The vapors are drawn by a blower 21 via a conduit 20 and supplied into a steam overheater 22. Repeated heating to approximately 600° C. takes place in the overheater 22. Heating of the overheater 22 is performed by a circulating gas of a not shown coke dry cooling device, which is supplied via a conduit 23 into the overheater 22 and withdrawn from the latter via a conduit 24. In the present case nitrogen is used as a circulating gas of the coke dry cooling. For regulating the temperature condition in the overheater 22, a bypass conduit 25 is provided and connects the conduits 23 and 24 with one another.

The fine coal separated in the cyclone 19 is supplied by the cellular wheel sluice 26 and joins coal located on the trough screw conveyor 16. The entire preheated coal with a temperature of approximately 200° C. is transported by a closed chain conveyor 27 to a not shown coal tower of a coke plant. The trough screw conveyor 16 and the chain conveyor 27 are electrically heated to avoid heat losses during transportation of the preheated coal.

The steam which is overheated in the overheater 22 to approximately 600° C. is withdrawn via the conduit 5 which opens into the first throughflow drier 4. Since the coal is considerably dried in the first throughflow drier 4, the second throughflow drier 12 is required substantially only for further heating of the coal to an end temperature of approximately 200° C. and for removal of the residual moisture from the coal. Its heat consumption is therefore not as high as that of the first throughflow drier 4. It is sufficient when for heating of the throughflow drier 12, steam with a temperature only approximately 500° C. is used.

A conduit 48 branches from the conduit 20 leading to the overheater 22 and opens directly into the lower part of the throughflow drier 12. A part of the vapors can be drawn through the conduit 48. These vapors have a temperature of approximately 200° C. In order to reach the desired steam temperature of approximately 500° C. in the throughflow drier 12, a part of the steam heated to approximately 600° C. is supplied via a conduit 28 from the conduit 5 so as to mix with the vapors in the conduit 48.

The vapors in the conduit 20 contain the steam separated during drying of the moist coal. Therefore, a partial condensation of the vapors must be performed. For this purpose the conduit 29 branches prior to the blower 21 so that a partial stream of the vapors is drawn through the conduit 29 and supplied to a circular scrubber 30. In the scrubber 30, in addition to condensation, simultaneously cleaning of impurities takes place.

Liquid flowing from the circulating scrubber 30 is supplied via a conduit 31 and a pump 33 to a cooling tower 32 in which cooling to approximately 40° C. is performed. The cooled liquid is then supplied via a conduit 34 to a cooling water distributor 35. Required cooling water is distributed from the distributor 35 via conduits 38, 39 and 40 to different levels of the circulating scrubber 30. The excessive water is withdrawn via a conduit 36 and supplied into a draining passage 37. In some cases the conduit 31 which leads from the circulating scrubber 30 to the cooling tower 32 can be provided with a not shown waste water treatment device. Solid fraction separated from the waste water has a high content of fine coal and can be either deposited or burned.

Gases which escape from the circulating scrubber 30 can be withdrawn via conduit 41 and supplied either to a not shown chimney or to an also not shown gas treatment stage. In some cases, the above described circuit can be simplified in such a manner that, instead of the circulating scrubber 30, a venturi scrubber can be used in which the partial condensation of the vapors takes place.

Water seals 42 and 43 are arranged at the bottom of the throughflow driers 4 and 12, respectively. Inert gas can be blown into the throughflow driers 4 and 12 through conduits 44 and 45, and fresh water can be blown into these throughflow driers via conduits 46 and 47.

It will be understood that each of the elements described above, or two or more together, may also find a useful application in other types of constructions differing from the types described above.

While the arrangement has been illustrated and described, as well as the method, as embodied in an arrangement for pretreating coal for a coking plant, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of pretreating coal for a coking plant with coal preheating and coke dry cooling, the method comprising the steps of heating and drying coal in two stages in two throughflow dryers successively connected with one another and supplied with steam, so that in a first one of the throughflow driers the steam is supplied with a temperature of substantially 600° C. and the coal is heated to a temperature substantially between 70°-90° C. and to a water content of substantially 2 weight %, whereas in a second one of the throughflow driers the steam is supplied with a temperature of substantially between 400°-500° C. and the coal is heated to a temperature of substantially 200° C. and dried to a residual water content of substantially 0-0.1 weight %;

removing dust from the steam after passing through the throughflow driers; and heating the steam after dust removal in the heat exchange relationship with a circulating gas of a coke dry cooling operation.

2. A method as defined in claim 1 and further comprising the step of withdrawing vapor produced by drying coal in the dryers, said step of heating the coal in the second dryer including mixing a partial stream of steam at a temperature of substantially 600° C. with the vapor produced by drying coal in the dryers and using the thus-produced mixture for heating the coal in the second dryer.

3. A method as defined in claim 1 and further comprising the steps of withdrawing vapor produced by drying coal in the dryers, and removing excessive steam from the withdrawn vapor.

4. A method as defined in claim 3, wherein said step of removing excessive steam from the withdrawn vapor includes partially condensing the same.

* * * * *